United States Patent [19]
Terwesten

[11] Patent Number: 5,938,149
[45] Date of Patent: Aug. 17, 1999

[54] ARRANGEMENT FOR MOUNTING FIXTURES SUCH AS BAGGAGE COMPARTMENTS NEAR THE CEILING OR A PASSENGER CABIN, ESPECIALLY IN AN AIRCRAFT

[75] Inventor: Ulrich Terwesten, Hamburg, Germany

[73] Assignee: DaimlerChrysler Aerospace Airbus GmbH, Hamburg, Germany

[21] Appl. No.: 08/917,788

[22] Filed: Aug. 13, 1997

[30] Foreign Application Priority Data

Aug. 20, 1996 [DE] Germany ............................ 196 33 469

[51] Int. Cl.$^6$ ...................................................... B64D 11/00
[52] U.S. Cl. ........................ 244/118.5; 248/505; 248/503; 312/245; 312/242
[58] Field of Search ............................... 244/118.1, 118.5, 244/119; 248/505, 503; 312/265, 242, 351.1

[56] References Cited

U.S. PATENT DOCUMENTS

| | | |
|---|---|---|
| 4,125,302 | 11/1978 | Peritz et al. . |
| 4,316,545 | 2/1982 | Hartnell . |
| 4,462,498 | 7/1984 | Walker . |
| 4,520,979 | 6/1985 | McInnis . |
| 4,799,631 | 1/1989 | Humpries et al. . |
| 5,129,597 | 7/1992 | Manthey et al. . |
| 5,131,620 | 7/1992 | Boundy . |
| 5,244,269 | 9/1993 | Harriehausen et al. . |
| 5,383,628 | 1/1995 | Harriehausen et al. . |
| 5,395,074 | 3/1995 | Hart et al. . |
| 5,441,218 | 8/1995 | Mueller et al. . |

FOREIGN PATENT DOCUMENTS 0718189  6/1996  European Pat. Off. .

*Primary Examiner*—Charles T. Jordan
*Assistant Examiner*—Tien Dinh
*Attorney, Agent, or Firm*—W. F. Fasse; W. G. Fasse

[57] ABSTRACT

A mounting arrangement for mounting and providing a safety support of cabin fixtures such as baggage compartments in a passenger cabin, especially in an aircraft, includes substantially rigid mounting hardware and substantially non-rigid safety support elements. The mounting hardware mounts the baggage compartments to the aircraft fuselage structure in a substantially rigid manner, with adequate strength for normal operating conditions and certain overload conditions. The safety support elements provide an additional connection between the baggage compartments and the fuselage structure, and are installed in such a manner that they are not load bearing under normal conditions, but rather only come into play under extreme load conditions in which at least one of the substantially rigid mounting hardware elements has failed. In such a case, the safety support elements effectively catch and hold the respective baggage compartment substantially in its original or normal position, and aim to prevent the baggage compartment from falling and causing a danger of injury to passengers. The safety support elements are preferably non-rigid elements such as safety cables, wires, ropes, straps, belts, or the like that can support tension loads, but cannot support lateral or compression loads. The safety support elements may be easily and cheaply installed in new aircraft construction or retrofitted in existing aircraft.

25 Claims, 3 Drawing Sheets

ARRANGEMENT FOR MOUNTING FIXTURES SUCH AS BAGGAGE COMPARTMENTS NEAR THE CEILING OR A PASSENGER CABIN, ESPECIALLY IN AN AIRCRAFT

FIELD OF THE INVENTION

The invention relates to an arrangement for mounting fixtures in the upper region or portion of a passenger cabin of a vehicle, and especially for mounting baggage compartments and the like in an aircraft passenger cabin. Alternatively, the vehicle may be a railroad car or the like. The arrangement includes mounting elements connecting the fixtures to the vehicle fuselage structure.

BACKGROUND INFORMATION

In commercial transport aircraft, the overhead baggage compartments are typically connected to or mounted on the fuselage structure of the aircraft by means of rigid mounting hardware, such as metal fittings, bolts, rods, and the like. Connection points for connecting the rigid mounting hardware to the fuselage structure are provided on the spars, frame or rib members, stringers, and fuselage skin. Pertinent safety regulations prescribe the necessary strength of the mounting hardware, i.e. the load that must be supported by the mounting hardware without failure, especially in view of extreme loads that arise during emergency landing conditions. Thus, the known mounting arrangements or mounting hardware configurations are intended to provide a safety margin of strength beyond the strength needed for normal operating conditions and specifically to provide sufficient strength for the extreme loads prescribed in the safety regulations.

In the above described manner, it is intended to be assured that the baggage compartments remain at their proper locations and do not fall down or become dislodged even under the prescribed extreme loads, to reduce or minimize the danger of passengers being injured by falling baggage items or components of the baggage compartments, and thus to provide the highest possible measure of safety for the passengers. However, under the extreme conditions of an emergency landing or crash, a certain risk remains that the loads effective on the mounting hardware will exceed the load levels prescribed in the safety regulations. In such a case, the loads may exceed the actual strength limit of the known mounting hardware, such that the hardware fails and the baggage compartments become dislodged or completely fall down onto the passengers. Thus, it has not been possible to completely exclude the danger of injury to the passengers.

If the typical known mounting arrangements were to be strengthened, for example by using mounting members having larger crosssectional dimensions or stronger materials, this would require a considerable expense and effort of reconstruction and alteration in existing aircraft, and of extra construction measures in new aircraft. Moreover, such an approach would result in a significantly greater weight of the mounting hardware as well as the connected structures. Such an increase in weight is undesirable in aircraft.

SUMMARY OF THE INVENTION

In view of the above, it is an object of the invention to provide a mounting arrangement for mounting fixtures, such as baggage compartments or components thereof, within a passenger cabin in such a manner so as to provide an additional measure of safety or protection against the baggage compartments falling down under extreme load conditions. It is a further object of the invention to provide such a mounting arrangement that may easily and conveniently be retrofitted in existing aircraft as well as being provided in new aircraft construction. Further objects of the invention are to avoid the disadvantages of the prior art, and to achieve additional advantages as discussed herein. The invention aims to achieve the above objects using only cost-economical, simple, and lightweight components that may easily be installed. Thereby, the invention aims to minimize the remaining or residual risk of baggage compartments falling down, and thus to provide a high measure of safety and protection for the passengers against serious injuries resulting from the cabin fixtures falling down.

The above objects have been achieved in a mounting arrangement for mounting cabin fixtures such as baggage compartments in a passenger cabin, according to the invention. In addition to rigid mounting elements connecting the baggage compartment or other fixture to the fuselage structure, the invention provides safety support elements that are connected to the fuselage structure and to the cabin fixtures in such a way that they are not substantially loaded in normal operating conditions and only take up a load under extreme loading conditions after at least one of the rigid mounting elements has failed, e.g. been broken or deformed. The safety support elements are preferably non-rigid tension-bearing members, which are respectively able to bear a tension load, but are unable to bear substantial compression loads along an axial direction of the element or lateral loads perpendicular to the axial direction. For example, the present safety support elements may comprise safety ropes, cables, wires, bands, belts, or straps, and may be connected respectively to the fuselage structure and the cabin fixture by connector elements such as loops and karabiner hooks. Thus, the safety support elements are initially installed in a substantially non-tensioned state so that they do not bear the load of the baggage compartment, while the rigid mounting hardware elements support the entire load of the baggage compartment under ordinary operating conditions. It should be understood that a slight load may be applied to the safety support elements simply due to the slight tension that may inherently arise when installing the safety support members.

In particular embodiments of the invention, the present safety support elements may respectively form a cable loop that is looped around the baggage compartment and extends along a length-wise support rail member that is already present beneath the baggage compartment. Alternatively, the support elements may be attached directly to side parts of the baggage compartments, and may be secured at recesses or openings within structural components of the aircraft fuselage structure or the baggage compartment structure. As a further alternative, the safety support elements may be secured directly to mounting elements attached to the fuselage structural components for supporting cabin interior paneling or other interior finish components or fixtures. Additional or specialized securing elements may also be provided for connecting the safety support elements to the fuselage structure.

BRIEF DESCRIPTION OF THE DRAWINGS

In order that the invention may be clearly understood, it will now be described in connection with an example embodiment as shown in the drawings, wherein.

DETAILED DESCRIPTION OF PREFERRED EXAMPLE EMBODIMENTS AND OF THE BEST MODE OF THE INVENTION

Figure 1:
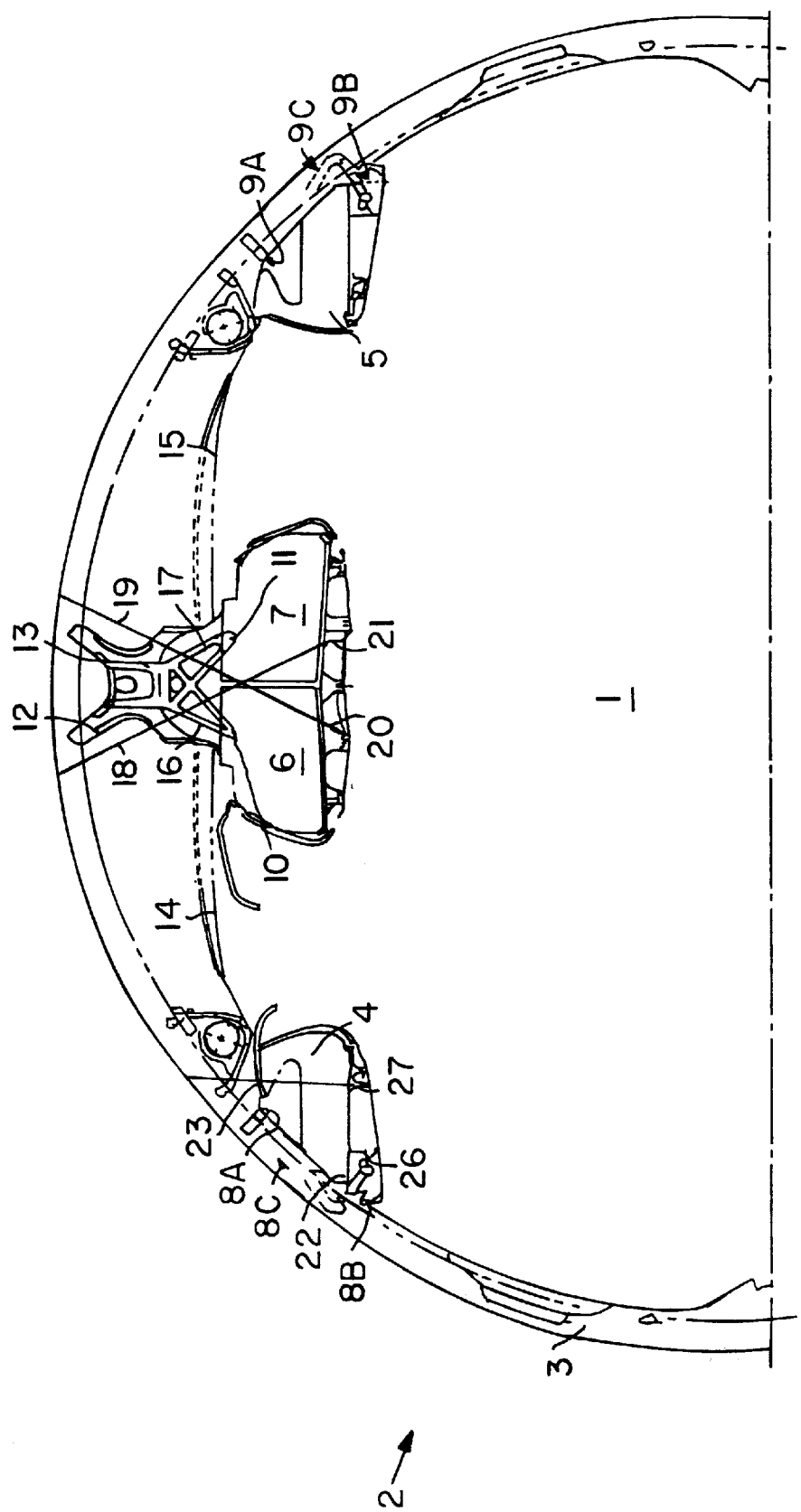
FIG. 1 shows a cross-section through the upper portion of a passenger cabin in an aircraft, with baggage compartments mounted therein according to the invention.

FIG. 1 shows a cross-section through the upper portion of a passenger cabin 1 provided in the upper deck of an aircraft 2. Various cabin interior panel components and other fixtures that are typically used for equipping and finishing the interior of the passenger cabin 2 are connected to the structure of the aircraft 2, for example to the upper fuselage shell 3. For example, side baggage compartments 4 and 5 and center baggage compartments 6 and 7 are arranged in the passenger cabin 1 in areas above the respective passenger seats. The baggage compartments 4, 5, 6 and 7 are substantially rigidly connected to the fuselage structure 3 by first mounting means including mounting elements such as specialized metal fittings, mounting frames, bolts, struts and/or rods arranged so as to provide the required rigid connection between the fuselage structure and the baggage compartment. For example, the side baggage compartments 4 and 5 are respectively connected to the fuselage structure 3 at three respective connection points 8A, 8B and 8C or 9A, 9B and 9C.

Figure 2:
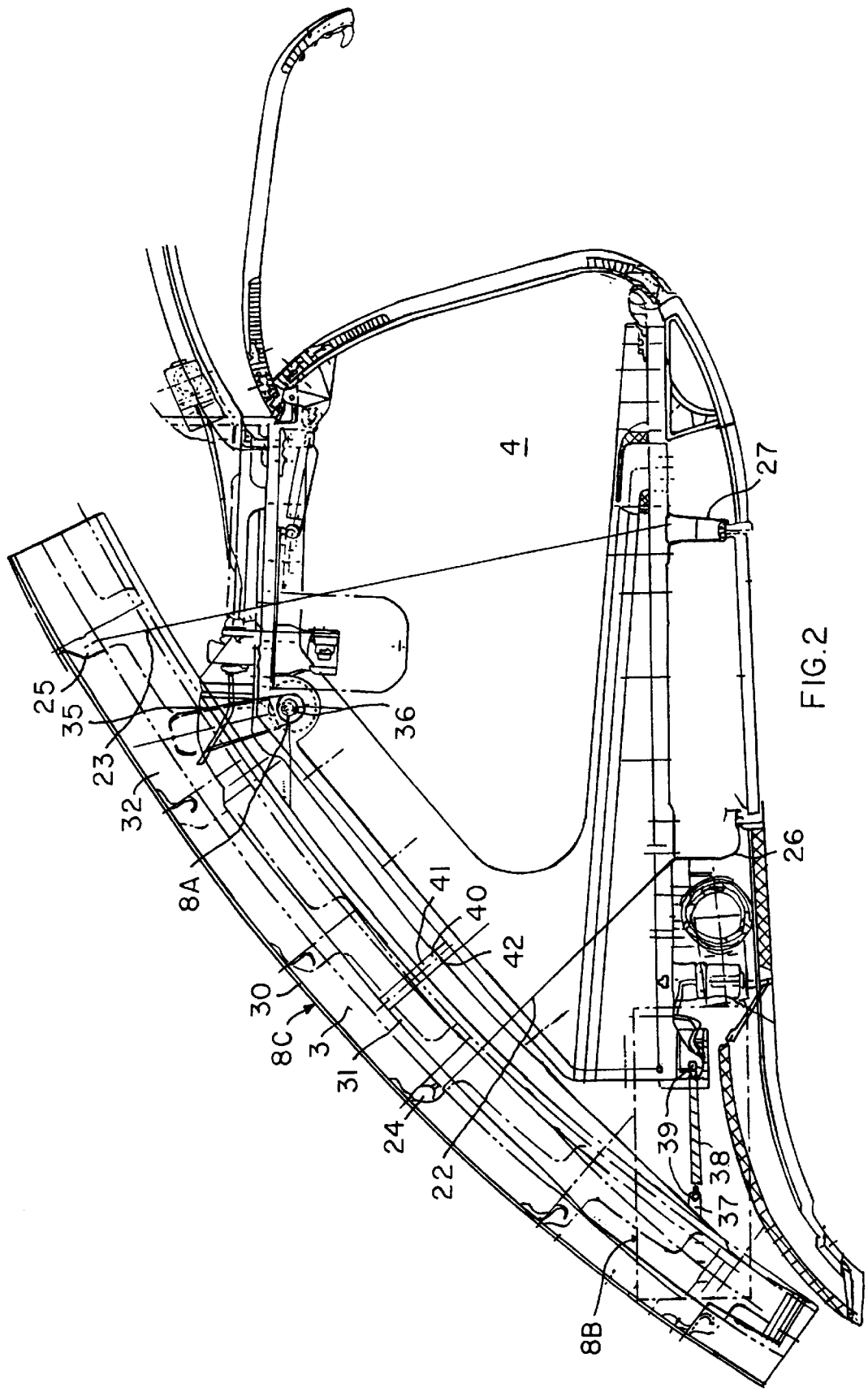
FIG. 2 shows an enlarged section through a baggage compartment connected to the fuselage structure, according to the invention, at a side of the passenger cabin.

As shown in FIG. 1, and more particularly in FIG. 2, the connection points 8A and 9A use mounting fittings or brackets 35 and bolts 36 to form a rigid connection between the respective baggage compartment 4 or 5 and a fuselage frame or rib member 32, so as to primarily support the respective baggage compartment 4 or 5 in a vertical direction. The connection points 8B and 9B respectively use mounting fittings or brackets 37, rods 38 and bolts 39 to form a rigid connection between the respective baggage compartment 4 or 5 and the frame or rib member 32, so as to securely hold the respective baggage compartment 4 or 5 primarily in the horizontal direction. The connection points 8C and 9C use mounting fittings or brackets 40, rods 41, and bolts 42 to rigidly connect the respective baggage compartment 4 or 5 to a fuselage stringer 31 and/or the fuselage skin 30, so as to securely hold the respective baggage compartment 4 or 5 primarily in the direction of the aircraft lengthwise axis.

Referring again to FIG. 1, the center baggage compartments 6 and 7 are arranged along the aircraft lengthwise axis near the center or middle area of the fuselage upper shell 3. In this area, a Y-strut 12 is preferably secured to a fuselage frame or rib member. Among other things, cabin interior panels 14 and 15 are secured to and supported by this Y-strut 12. A specialized mounting fitting or bracket 13 is also secured to the Y-strut 12 and in turn forms a supporting connection for the center baggage compartments 6 and 7. More particularly, the mounting bracket 13 comprises a framework including mounting arms 16 and 17 extending generally downwardly, at which a respective baggage compartment 6 or 7 is mounted at a respective connection point 10 or 11. Additionally, the center baggage compartments 6 and 7 are secured to stringers and/or the fuselage skin in the upper area of the fuselage structure 3 by means of mounting brackets, rods, and bolts, in any known manner, so as to secure the baggage compartments 6 and 7 in the direction of the aircraft lengthwise axis.

The various mounting hardware components described above, such as the brackets, bolts, rods, struts, and the like, are designed, configured and arranged to provide a sufficiently strong connection of the baggage compartments 4, 5, 6 and 7 with the fuselage structure, so that the baggage compartments 4, 5, 6, and 7 are securely held in their prescribed positions under normal operating conditions and also under the extreme loads set forth in the various pertinent safety regulations. However, there is a remaining risk that under certain extreme conditions, loads might arise that exceed the safety threshold limits prescribed in the safety regulations. In such a case, the above described mounting hardware such as the brackets, rods, bolts and the like may fail by rupturing, deforming or becoming detached, due to being subjected to such extreme loads.

In order to minimize the resulting risk to the passengers, i.e. to provide an additional measure of safety to hold the baggage compartments 4, 5, 6 and 7 in the event that the above described mounting hardware fails, the inventive arrangement additionally includes second support means or safety support elements for the baggage compartments. As shown in an exemplary manner in FIGS. 1 and 2, safety support means or elements 18 and 19 provide an extra safety connection between the center baggage compartments 6 and 7 and the fuselage structure 3, and the safety support means or elements 22 and 23 provide an additional safety connection between the side baggage compartment 4 and the fuselage structure 3. The safety support means for the side baggage compartment 5 are not shown, for reasons of simplicity, but correspond to the support means 22 and 23 provided on the other side baggage compartment 4.

According to the invention, the safety support means or elements are preferably substantially non-rigid members such as safety cables, wires, cords, ropes, straps, bands, or belts, which are respectively each connected at one end to the fuselage structure 3 and at the other end to the respective baggage compartment 4, 5, 6 or 7. In the present application, the terms "substantially rigid" and "rigid" refer to a rigidity that is sufficient to support tension loads, compressive loads, and lateral loads, and that is exemplified by the rigidity exhibited by typical known mounting hardware such as brackets, rods and bolts used to mount overhead baggage compartments and the like in an aircraft passenger cabin. On the other hand, the terms "substantially non-rigid" and "non-rigid" describe the degree or type of rigidity of a structural member that can bear tension loads, but cannot bear substantial compressive loads or lateral loads relative to an axial direction thereof, wherein such members are exemplified by cables, wires, ropes, bands, belts, straps, and the like.

The safety support elements are preferably made of synthetic polymer materials, for example such as polyamides, which may be further reinforced with fibers to prepare a synthetic composite material, in a single-strand or multi-strand arrangement. Such synthetic materials or composite materials are especially advantageous due to their low weight and high strength characteristics, and because they can absorb significant energy by means of relatively large plastic deformations. Alternatively, the safety support elements may be made of metal, such as multi-strand steel cables. In any event, the material for the safety support elements should be selected in consideration of and in conformance with the fire retarding regulations for components used within an aircraft cabin, whenever applicable.

Preferably, the safety support elements are configured and installed in such a manner that they are not subjected to loading under normal load conditions. Namely, the above described substantially rigid mounting hardware supports substantially the entire weight of the respective baggage compartment under normal conditions. However, in the event of an extreme load that leads to the breaking or other failure of the regular rigid mounting hardware, whereupon the respective baggage compartment 4, 5, 6 or 7 would fall down, the present safety support elements come into play to "catch" and support the respective baggage compartment. Thus, the safety support elements form a back-up or safety suspension for supporting the baggage compartments in a position at least close to or substantially equal to the regular mounting position of the baggage compartments. Such a position is sufficiently near the nominal installed position of the baggage compartment so as not to cause a significant danger of injury to passengers seated therebelow, and is defined by the distance the baggage compartment moves in applying elastic tension to the respective safety support element and then plastically deforming the safety support element if applicable.

FIG. 1 shows safety cables 18 and 19 supporting the center baggage compartments 6 and 7, whereby each respective safety cable 18 and 19 is provided for and connected to one of the baggage compartments 6 and 7. The safety cables 18 and 19 are preferably arranged in a crossed-over X-configuration, whereby the cable 18 connected to the right baggage compartment 7 is connected to the fuselage structure on the left side of a center plane, while the cable 19 connected to the left baggage compartment 6 is connected to the fuselage structure 3 on the right side of a center plane. In this manner, the combined arrangement of the two cables 18 and 19 with the two adjacent baggage compartments 6 and 7 provides a sufficient support, while using only one cable per baggage compartment. Since each cable 18 and 19 can only support tension loads along its axial direction, the crossed-over configuration provides a vertical support component as well as a lateral or side-to-side support component. Alternatively, it is possible to provide an arrangement including several safety cables or other safety elements per baggage compartment, as exemplified by the safety cables 22 and 23 provided for the single side baggage compartment 4, as shown in FIGS. 1 and 2. The details of the arrangement shown in FIG. 2 will be described further below.

Figure 3:
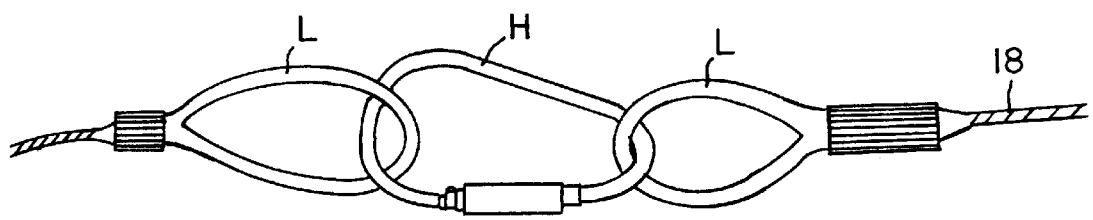
FIG. 3 shows an example of a karabiner hook connecting two cable loops provided on cable ends.

In one preferred form, the safety cable 18 or 19 is configured as a cable loop that is looped around the respective baggage compartment 6 or 7. More particularly, the cable 18 or 19 may be connected to the baggage compartments 6 or 7 by being looped around any convenient and sufficiently strong connection point available on the baggage compartment structure. At their upper ends or portions, the cables 18 and 19 are secured to the fuselage structure 3, for example at any recesses or notches advantageously present in the frame or rib members or any openings present in the fuselage structural components. In order to make the installation and attachment of the safety cables 18 and 19 particularly simple, the cables may be provided with any known connector elements, such as cable loops L or karabiner-type hooks H at the cable ends, or at various locations along the cable, as shown in FIG. 3 for example. In this manner, the respective cable can be looped around or clipped onto any available and suitable attachment points, and it is possible to retrofit or install the safety support elements even in existing passenger cabin constructions without requiring extensive alterations in the existing construction. Furthermore, the additional weight of the safety support elements is only minimal.

As example installation embodiments, the safety cables may form a cable loop that is extended or looped around the baggage compartment, or the safety cable may be directly attached to the baggage compartment, for example, to a side wall of the baggage compartment. In the particular embodiment shown for the center baggage compartments 6 and 7 in FIG. 1, the safety cables 18 and 19 form a cable loop 18, 19 for each respective baggage compartment, whereby the loop is secured to the fuselage structure 3, and then looped down around and underneath the respective baggage compartment 6 and 7 to extend along a respective lengthwise support profile member 20 and 21 of the baggage compartment 6 and 7, whereupon the cable loop 18 or 19 is secured underneath the respective baggage compartment 6 or 7.

The safety support provided by the safety support elements is not active in the case of normal loads. Namely, as installed, the safety cables 18 and 19 are not taught and thus do not support the baggage compartments 6 and 7, which instead are supported in the usual manner by the above described rigid mounting hardware. Only after one or more of the rigid mounting hardware elements have failed, for example in the event of a crash, and the respective baggage compartment 6 or 7 would fall down, then the respective safety cables 18 and 19 come into play to catch the falling baggage compartment. Therefore, the safety mounting means or elements preferably have the capacity to absorb energy through plastic strain deformation of the respective elements, so as to reduce and absorb the peak loads, and must have a sufficient ultimate strength to hold such extreme peak loads that are greater than the maximum loads supportable by the above described rigid mounting hardware and greater than the threshold levels prescribed by the pertinent safety regulations. Furthermore, due to the energy being absorbed by deformation of the safety support elements, as well as the force being elastically applied to the safety support elements, the risk of the aircraft structure failing at the attachment points of the above described mounting hardware is reduced.

FIG. 2 shows the details of the safety support provided for a side baggage compartment 4. As described above, the baggage compartment 4 is substantially rigidly secured to the fuselage upper shell 3 by a bracket-bolt connection 35, 36 at the connection point 8A, and by a bracket-bolt-rod connection 40, 41, 42, or 37, 38, 39 respectively at the connection points 8B and 8C. In addition, two safety support elements 22 and 23 are arranged to provide a further connection between the baggage compartment 4 and the fuselage upper shell 3. In order to attach the safety support elements 22 and 23 to the fuselage upper shell 3, the respective safety support elements 22 and 23 are respectively passed or looped through or hooked into available or existing openings 24 and 25 between the fuselage skin, the frame or rib member, and the construction clips.

In the preferred embodiment, the safety support elements 22 and 23 are respectively in the form of a cable loop that loops through the openings 24 or 25 respectively and then loops down around the floor of the baggage compartment along mounting rails 26 and 27 which are provided for mounting the passenger service units (so-called PSUs) beneath the baggage compartment 4. In this manner, it is quite simple to retrofit the cables 22 and 23 even in existing baggage compartment mounting arrangements. It should be understood that safety cables or other safety mounting members of different types can be used to provide the safety support for the baggage compartments, while using any available or existing openings and attachment points on the aircraft structure, in order to loop the safety elements around or otherwise attach the safety elements to the baggage compartment and to the aircraft fuselage structure. For the various embodiments of the invention, it is only essential that a safety support arrangement is provided which is not active under normal conditions, and only becomes effective once a typical mounting hardware element breaks or comes free from its attachment.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a vehicle having a vehicle body, a passenger cabin provided within said vehicle body, and a cabin fixture arranged in an upper portion of said passenger cabin, an improved mounting arrangement for mounting said cabin fixture on said vehicle body comprising at least one mounting element respectively connected to and between said cabin fixture and said vehicle body, and at least one safety support element respectively connected to and between said cabin fixture and said vehicle body, wherein said at least one mounting element and said at least one safety support element are respectively so configured and arranged such that said at least one mounting element supports essentially an entire load of said cabin fixture and said at least one safety support element supports essentially none of said entire load in a normal condition of said mounting arrangement, and such that said safety support element supports at least a portion of said load in a failure condition of said mounting arrangement in which said at least one mounting element has failed.

2. The mounting arrangement in the vehicle in accordance with claim 1, wherein said vehicle is an aircraft, said vehicle body is an aircraft fuselage, and said cabin fixture comprises an overhead luggage compartment.

3. The mounting arrangement in the vehicle in accordance with claim 1, wherein said cabin fixture is supported in a nominal position by said at least one mounting element in said normal condition, and wherein said at least one safety support element is adapted to support said cabin fixture at least nearly in said nominal position in said failure condition.

4. The mounting arrangement in the vehicle in accordance with claim 1, wherein said at least one safety support element has a first total failure load limit that is greater than a second total failure load limit of said at least one mounting element.

5. The mounting arrangement in the vehicle in accordance with claim 1, wherein said at least one mounting element is substantially rigid and is substantially rigidly connected to and between said cabin fixture and said vehicle body, and wherein said at least one safety support element is substantially non-rigid.

6. The mounting arrangement in the vehicle in accordance with claim 5, where in said at least one mounting element is adapted to support tension loads, compression loads and lateral loads, and wherein said at least one safety support element is respectively adapted to support tension loads and essentially not to support compression loads and lateral loads.

7. The mounting arrangement in the vehicle in accordance with claim 1, wherein said at least one safety support element comprises at least one tension support member selected from the group consisting of cables, wires, ropes, cords, bands, straps and belts.

8. The mounting arrangement in the vehicle in accordance with claim 7, wherein said at least one tension support member is a cable.

9. The mounting arrangement in the vehicle in accordance with claim 7, wherein said at least one safety support element further comprises a connector member attached to said tension support member.

10. The mounting arrangement in the vehicle in accordance with claim 9, wherein said connector member is selected from the group consisting of loops and karabiner hooks.

11. The mounting arrangement in the vehicle in accordance with claim 7, wherein said at least one mounting element comprises at least one mounting member selected from the group consisting of rigid mounting brackets, bolts, rods, and struts.

12. The mounting arrangement in the vehicle in accordance with claim 1, further comprising a lengthwise support member extending lengthwise along a bottom of said cabin fixture, wherein said at least one safety support element comprises a cable loop that is looped around at least a portion of said cabin fixture and extends along said lengthwise support member beneath said cabin fixture.

13. The mounting arrangement in the vehicle in accordance with claim 1, wherein said cabin fixture comprises a bottom member and two side members extending up from said bottom member, and wherein said at least one safety support member is connected to at least one of said two side members of said cabin fixture.

14. The mounting arrangement in the vehicle in accordance with claim 1, wherein said vehicle body includes a vehicle skin and a vehicle frame comprising a plurality of frame members, with at least one of openings and recesses formed at a location on said frame members, between respective ones of said frame members, or between respective ones of said frame members and said vehicle skin, and wherein said at least one safety support element passes through said at least one of openings or recesses so as to be connected to said vehicle body.

15. The mounting arrangement in the vehicle in accordance with claim 1, wherein said at least one safety support element is connected directly to said at least one mounting element and thereby is connected to said vehicle body.

16. The mounting arrangement in the vehicle in accordance with claim 1, further comprising a cabin interior panel, and a mounting member respectively connected to and between said cabin interior panel and said vehicle body, wherein said safety support element is connected directly to said mounting member and thereby is connected to said vehicle body.

17. The mounting arrangement in the vehicle in accordance with claim 1, further comprising additional connector elements by which said at least one safety support element is connected to said vehicle body.

18. The mounting arrangement in the vehicle in accordance with claim 1, comprising at least two of said safety support elements arranged non-parallel to each other, and adapted to provide respective supporting forces in two non-parallel directions in said failure condition.

19. The mounting arrangement in the vehicle in accordance with claim 18, wherein said two safety support elements are crossed over each other in an X-configuration.

20. The mounting arrangement in the vehicle in accordance with claim 1, wherein said at least one safety support element comprises a synthetic polymer material.

21. The mounting arrangement in the vehicle in accordance with claim 20, wherein said synthetic polymer material is a polyamide.

22. The mounting arrangement in the vehicle in accordance with claim 20, wherein said at least one safety support element further comprises reinforcement fibers embedded in said synthetic polymer material.

23. The mounting arrangement in the vehicle in accordance with claim 1, wherein said at least one safety support element is configured and comprises a material selected so that said at least one safety support element will undergo plastic strain deformation but will not rupture upon application of a load exceeding the strength limit of said at least one mounting element.

24. A mounting arrangement for mounting an overhead baggage compartment in a passenger cabin of an aircraft, comprising a substantially rigid mounting member comprising at least one of a rigid mounting bracket, a rod, a strut, and a bolt adapted to rigidly connect the baggage compartment to a fuselage of the aircraft and to support the weight of the baggage compartment in a normal operating condition, and a substantially non-rigid safety support member adapted to connect the baggage compartment to the fuselage without supporting the weight of the baggage compartment in the normal operating condition and adapted to support the weight of the baggage compartment in an extreme condition in which said mounting member has failed.

25. An aircraft construction comprising a fuselage, a baggage compartment, first means for rigidly connecting said baggage compartment to said fuselage and supporting said baggage compartment up to a threshold load condition, and second non-rigid means for connecting said baggage compartment to said fuselage and for supporting said baggage compartment only after said first means has at least partially failed in an extreme loading condition exceeding said threshold load condition.

* * * * *

UNITED STATES PATENT AND TRADEMARK OFFICE
CERTIFICATE OF CORRECTION

PATENT NO. : 5,938,149
DATED : Aug. 17, 1999
INVENTOR(S) : Terwesten

It is certified that error appears in the above-identified patent and that said Letters Patent is hereby corrected as shown below:

On the title page
in [54], line 3, replace "OR" by --OF--;

On the title page item [56], under "FOREIGN PATENT DOCUMENTS" replace "European Pat. Off." by --Europe--;

Col. 1, line 3, after "CEILING" replace "OR" by --OF--;

Col. 1, line 53, after "larger" replace "crosssectional" by --cross-sectional--;

Col. 2, line 47, before "support" replace "length-wise" by --lengthwise--;

Col. 8, line 25, after "support" replace "member" by --element--.

Signed and Sealed this

Seventeenth Day of October, 2000

Attest:

Q. TODD DICKINSON

*Attesting Officer*   *Director of Patents and Trademarks*